(12) United States Patent
Naslund et al.

(10) Patent No.: US 9,269,053 B2
(45) Date of Patent: Feb. 23, 2016

(54) ELECTRONIC REVIEW OF DOCUMENTS

(75) Inventors: Jeffrey David Naslund, Waconia, MN (US); Kevin B. Thompson, Pearl River, NY (US); David Dolan Lewis, Chicago, IL (US)

(73) Assignee: Kroll Ontrack, Inc., Eden Prairie, MN (US)

(*) Notice: Subject to any disclaimer, the term of this patent is extended or adjusted under 35 U.S.C. 154(b) by 149 days.

(21) Appl. No.: 13/458,219

(22) Filed: Apr. 27, 2012

(65) Prior Publication Data

US 2012/0278266 A1 Nov. 1, 2012

Related U.S. Application Data

(60) Provisional application No. 61/480,001, filed on Apr. 28, 2011.

(51) Int. Cl.
*G06F 15/18* (2006.01)
*G06N 99/00* (2010.01)

(52) U.S. Cl.
CPC ................... *G06N 99/005* (2013.01)

(58) Field of Classification Search
CPC ........................................................ G06N 5/00
USPC ............................................................ 706/45
See application file for complete search history.

(56) References Cited

U.S. PATENT DOCUMENTS

2009/0106239 A1* 4/2009 Getner et al. ...................... 707/5
2010/0077301 A1* 3/2010 Bodnick et al. ................ 715/274
2010/0205020 A1   8/2010 Losey
2010/0253967 A1* 10/2010 Privault et al. ............... 358/1.15
2010/0312725 A1* 12/2010 Privault et al. .................. 706/12

OTHER PUBLICATIONS

Cormack, Gordon V., et al. "Overview of the trec 2010 legal track." Proc. 19th Text Retrieval Conference. 2010.*
Roitblat, Herbert L., Anne Kershaw, and Patrick Oot. "Document categorization in legal electronic discovery: computer classification vs. manual review." Journal of the American Society for Information Science and Technology 61.1 (2010): 70-80.*
Buttcher et al., "Reliable Inforation Retrieval Evaluation with Incomplete and Biased Judgements," SIGIR '07, Jul. 27, 2007, 8 pages.
Cormack et al., Overview of the TREC 2010 Legal Track, Nov. 19, 2010, 45 pages.
International Search Report & Written Opinion in PCT/US2012/035531, mailed Oct. 10, 2012, 12 pages.
Soboroff, Ian, "A Comparison of Pooled and Sampled Relevance Judgments in the TREC 2006 Terabyte Track," The First International Workshop on Evaluating Information Access (EVIA), May 15, 2007, 10 pages.
Webber et al., "Score Adjustment for Correction of Pooling Bias," Proceedings of the 32nd International ACM SIGIR Conference on Research and Development in Information Retrieval, SIGIR '09, Jan. 1, 2009, 8 pages.

* cited by examiner

*Primary Examiner* — Kakali Chaki
*Assistant Examiner* — Kevin W Figueroa
(74) *Attorney, Agent, or Firm* — Merchant & Gould P.C.

(57) ABSTRACT

An example method for reviewing documents includes scoring documents using an artificial intelligence model, and selecting a subset of highest scoring documents. The method further includes inserting a number of randomly-selected documents into the subset of highest scoring documents to form a set of documents for review, wherein a reviewer cannot differentiate between the randomly-selected documents and the subset of highest scoring documents included in the set of documents for review, and presenting the set of documents for review by the reviewer.

16 Claims, 8 Drawing Sheets

ELECTRONIC REVIEW OF DOCUMENTS

BACKGROUND

The proliferation of electronic devices has resulted in businesses generating and storing most documents, such as contracts, communications, manuals, etc., in electronic formats. Paper documents can be scanned and converted to electronic formats as well. Database records may contain textual fields, and thus sets of records may be viewed as documents. The ease of creating electronic documents creates a significant volume of documents that can be difficult to manage. For example, in the litigation context, the review and categorization of documents during the discovery phase can result in considerable costs for litigants. This process usually involves a significant amount of manual review and analysis of the documents, even when the universe of documents is first culled by means such as custodian or date restrictions. The process can be further complicated in that the full extent of the documents that need to be reviewed is typically not known at the beginning of the process.

SUMMARY

In one aspect, an example method for reviewing documents includes scoring documents using an artificial intelligence model, and selecting a subset of highest scoring documents. The method further includes interspersing a number of randomly selected documents into the subset of highest scoring documents to form a set of documents for review, so that it is not indicated to the reviewer which documents in the set of documents for review were randomly selected documents and which were selected on the basis of high scores, and presenting the set of documents for review to the reviewer.

DESCRIPTION OF THE DRAWINGS

Aspects of the present disclosure may be more completely understood in consideration of the following detailed description of various embodiments in connection with the accompanying drawings.

DETAILED DESCRIPTION

The present disclosure is directed to systems and methods that allow for the electronic review of documents. This review can be used to efficiently identify certain documents from a large corpus of documents.

For example, in one context, the systems and methods described herein can be used in conjunction with the review of documents, such as during litigation or other contexts. For example, during litigation, a large corpus of documents can be efficiently analyzed in preparation for discovery, sometimes referred to as e-discovery. Based on the analysis, documents can be produced to an opposing party and/or documents from an opposing party can be analyzed.

The examples described herein are provided in the context of document production in litigation. However, the systems and methods are applicable to other areas as well. For example, the systems and methods described herein can be used to analyze documents during due diligence projects (e.g., mergers and acquisitions), historical research, law enforcement, intelligence analysis, or other projects requiring the review of a large number of documents.

Figure 1:
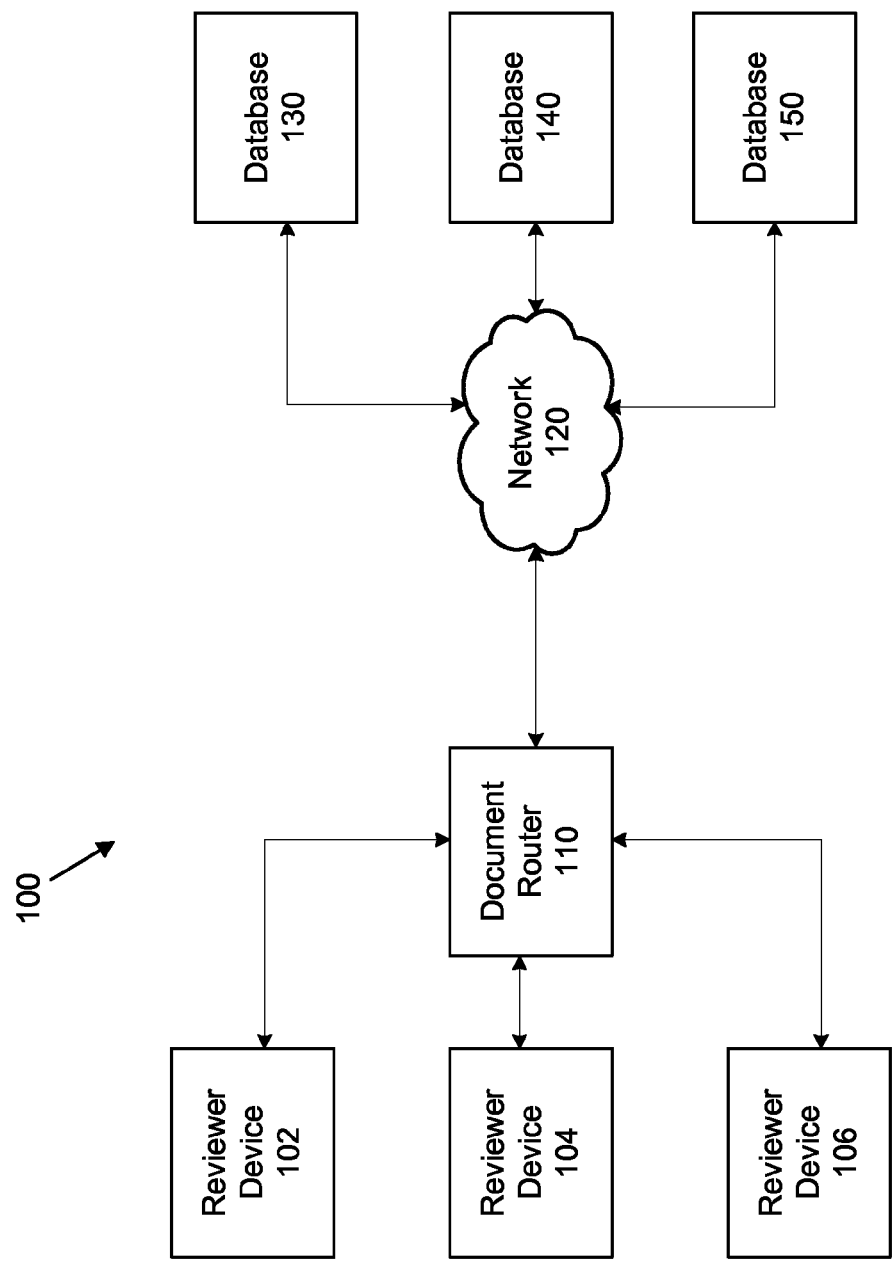
FIG. 1 shows an example networked computing environment.

Referring now to FIG. 1, an example networked computing environment 100 is shown. The networked computing environment 100 includes reviewer devices 102, 104, 106, a document router 110, a network 120, and databases 130, 140, 150. In these examples, the reviewer devices 102, 104, 106 and the document router 110 are computing devices, as described further below.

The reviewer devices 102, 104, 106 allow individuals to review and analyze electronic documents. This analysis is used to categorize the documents. For example, in one embodiment, the reviewer devices 102, 104, 106 are used to categorize documents as being "responsive" or "non-responsive" to requests made during discovery in litigation. Based on this categorization, a decision can be made whether or not to produce each document, or take other actions on each document, during the litigation.

The document router 110 routes documents from one or more repositories (e.g., databases 130, 140, 150) to one or more reviewers (e.g., reviewer devices 102, 104, 106) for analysis. In one example, the document router 110 identifies when a reviewer requests a group of documents and then pulls a group of documents from one of databases 130, 140, 150. As described further below, the documents can be pulled from the databases 130, 140, 150 using various techniques, such as pulling the documents based on a ranking of the documents.

The document router 110 also receives a record of the class labels chosen by the reviewers for each document back from the reviewer devices 102, 104, 106 once the documents have been labeled by the reviewer. Each class label provides an indication of which class or classes a document has membership in, with respect to one or more distinctions among classes, and with membership being indicated in an absolute fashion, by some numeric or symbolic degree of membership, or both. The documents and their class labels can then be further analyzed (e.g., used for training of an artificial intelligence model), and can also be stored in the databases 130, 140, 150.

The network 120 is a bi-directional data communication path for data transfer between one or more devices. In the example shown, the network 120 establishes a communication path for data transfer between the document router 110 and the databases 130, 140, 150. In general, the network 120 can be of any of a number of wireless or hardwired WAN, LAN, Internet, or other packet-based communication networks such that data can be transferred among the elements of the networked computing environment 100. Other embodiments of the network 120 are possible as well.

The databases 130, 140, 150 are repositories that store the groups of documents and associated metadata. Any known technique for storage and retrieval of the documents and/or metadata from the databases 130, 140, 150 can be used.

Figure 2:
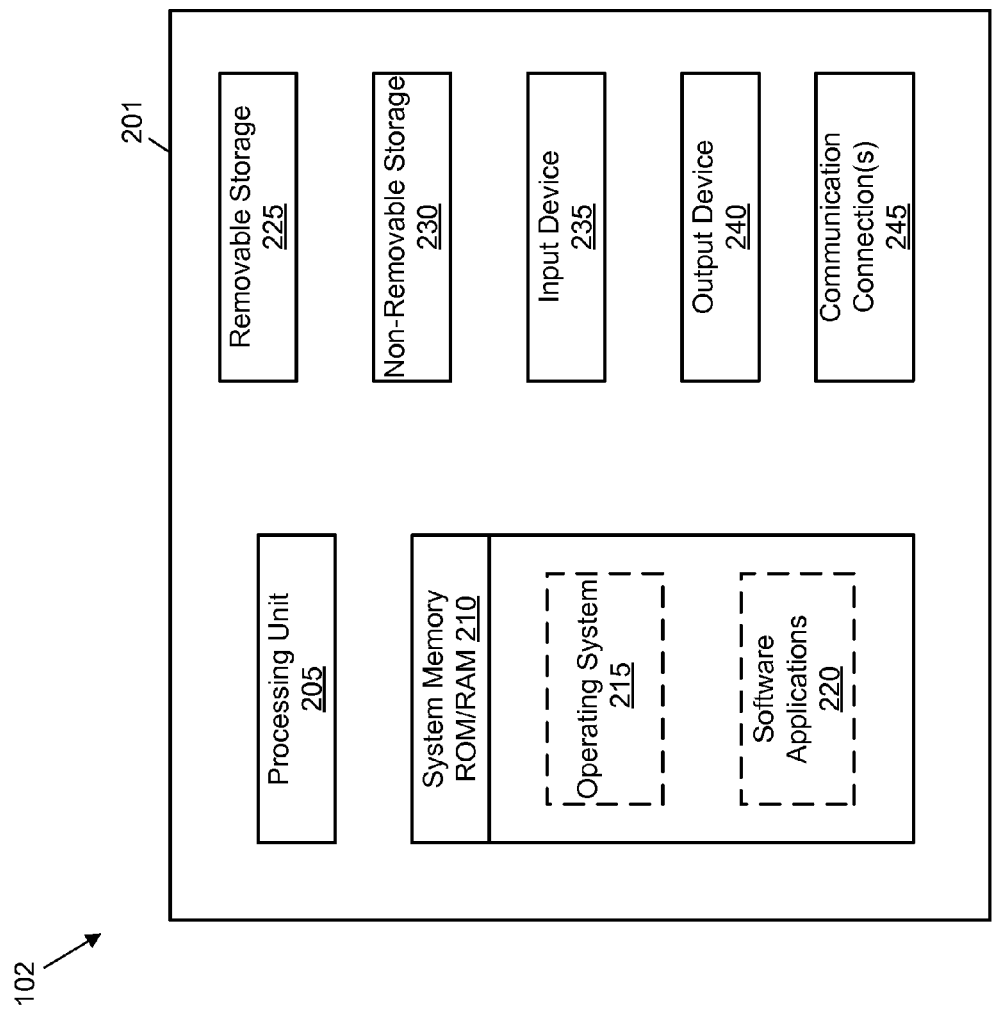
FIG. 2 shows an example computing device from the computing environment of FIG. 1.

Referring now to FIG. 2, in example embodiments, the reviewer device 102 is shown in more detail. In this example, the reviewer device 102 is a computing device 201.

The computing device 201 includes at least one processing unit 205 and a system memory 210. The system memory 210 can store an operating system 215 for controlling operation of the reviewer device 102 or another computing device. One example operating system 215 is WINDOWS® operating system from Microsoft Corporation of Redmond, Wash.

The system memory 210 may also include one or more software applications 220 and may include program data. Software applications 220 may include many different types of single and multiple-functionality programs, such as an electronic mail program, a calendaring program, an Internet browsing program, a spreadsheet program, a program to track and report information, a word processing program, and many others. One specific example of such an application is the ONTRACK® INVIEW™ discovery review tool from Kroll Ontrack Inc. of Eden Prairie, Minn.

The system memory 210 can include physical computer readable storage media such as, for example, magnetic disks, optical disks, or tape. Such additional storage is illustrated in FIG. 2 by removable storage 225 and non-removable storage 230. Computer readable storage media can include physical volatile and nonvolatile, removable and non-removable media implemented in any method or technology for storage of information, such as computer readable or computer-executable instructions, data structures, program modules, or other data.

Computer readable storage media can also include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed. Any such computer storage media may be part of or external to the networked computing environment 100.

Communication media is distinguished from computer readable storage media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, communication media includes wired media such as a wired network or direct-wired connection, and wireless media such as acoustic, RF, infrared and other wireless media.

The reviewer device 102 can also have any number and type of an input device 235 and output device 240. An example input device 235 includes a keyboard, mouse, pen, voice input device, touch input device, and others. An example output device 240 includes a display, speakers, printer, and others. The reviewer device 102 can also contain a communication connection 245 configured to enable communications with other computing devices over a network (e.g., network 120 of FIG. 1) in a distributed computing system environment.

In example embodiments, the various other devices (e.g., reviewer devices 104, 106 and document router 110) described herein can include one or more computing devices 201 configured in a manner similar to that shown in FIG. 2.

Figure 3:
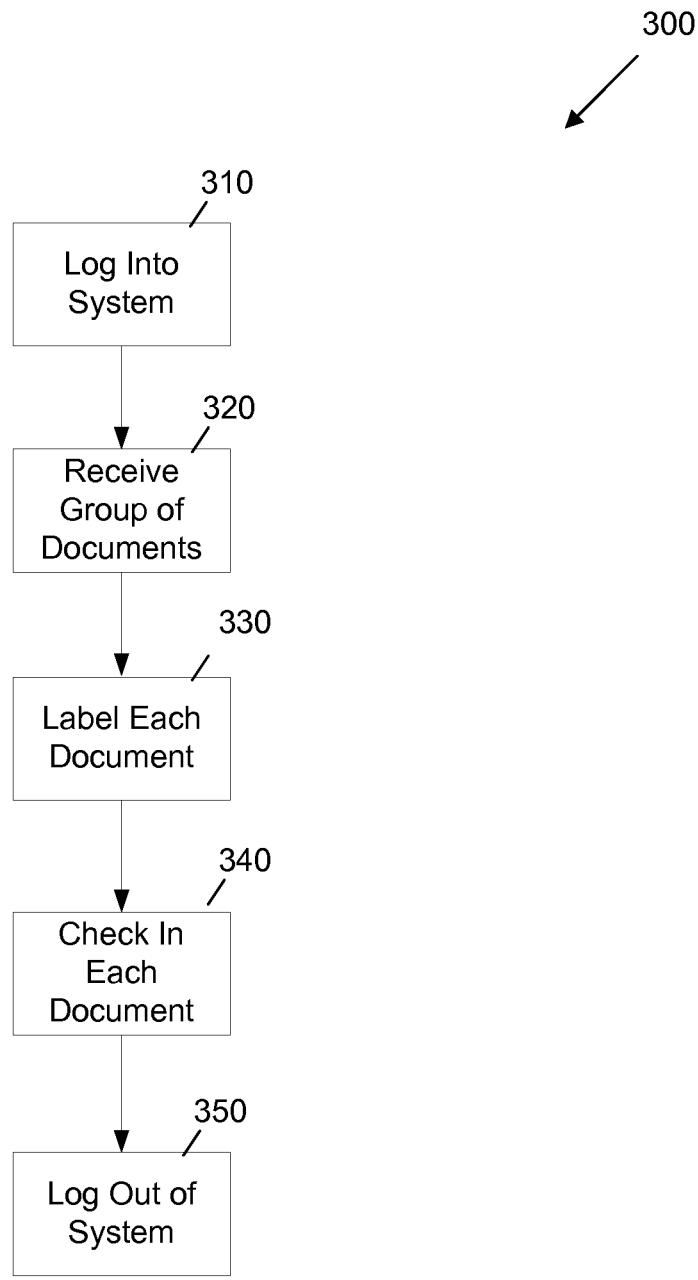
FIG. 3 shows an example method for a reviewer to review documents.

Referring now to FIG. 3, an example method 300 for a reviewer to review documents is shown. In this example, the reviewer can utilize one of the reviewer devices 102, 104, 106 to request the documents, analyze the documents, and return the analyzed documents upon completion of the analysis.

The method 300 begins at operation 310, when the reviewer logs into the system. This typically is accomplished when the reviewer provides credentials that allow the system to verify the reviewer's identity.

Next, at operation 320, the reviewer receives a group of documents for review. As described further below, the group of documents can be created using various methodologies. For example, the group of documents can be created using a First-In, First-Out (FIFO) scheme, a custodian scheme, a ranking scheme, a random scheme, or a combination thereof.

Next, at operation 330, the reviewer analyzes each document in the group. In this example, the analysis includes labeling of each document. For example, the reviewer can be asked to label categorize documents as being either "responsive" or "non-responsive" as defined in the context of the production of documents during litigation. A responsive document is a document that is relevant to discovery for the litigation (e.g., responsive to discovery requests like requests for production of documents and interrogatories). A non-responsive document is a document that is either not relevant to discovery, or privileged.

For each document in the group, the reviewer analyzes the document to determine the proper label to assign. Each document can be presented to the reviewer on the computing device so that the reviewer can review the document. The reviewer can review the document, as needed, and then label the document. For example they might label the document by choosing the name of the correct class from a menu. Once labeled, each document is checked in at operation 340. During the check-in process, the system confirms that the reviewer has provided a proper labeling for each document.

Finally, at operation 350, the reviewer logs out of the system.

Figure 4:
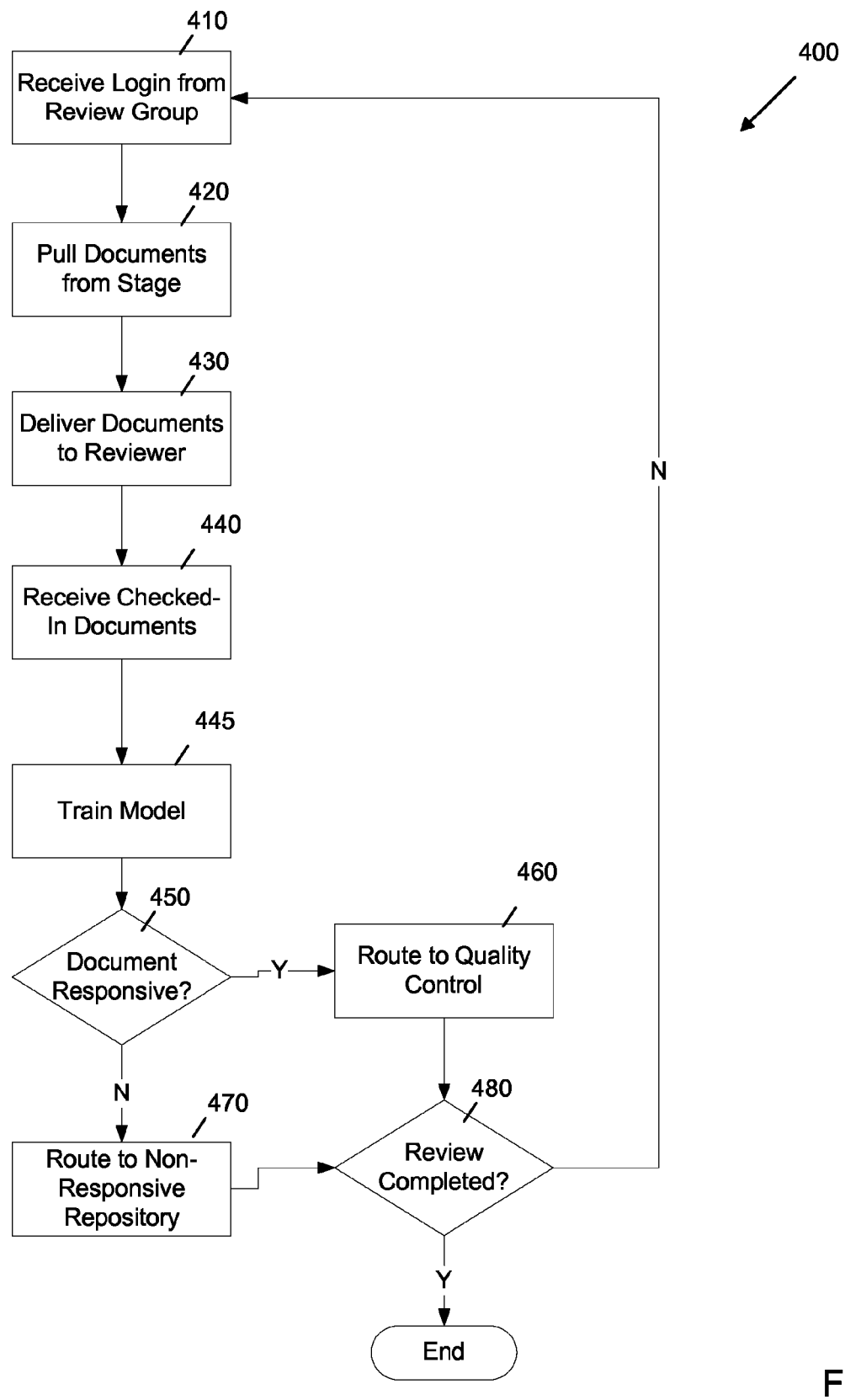
FIG. 4 shows an example method for managing documents for review.

Referring now to FIG. 4, an example method 400 for managing documents for review is shown. In this example, the method 400 is implemented by the document router 110.

Initially, at operation 410, a login request is received from a reviewer (e.g., from one of the reviewer devices 102, 104, 106).

Once a login is received, a set of documents is pulled (e.g., from one or more of the databases 130, 140, 150) for review at operation 420. As described further below with reference to FIGS. 5 and 6, the scheme used to pull the documents can vary. Examples include FIFO, by custodian, or by a ranking scheme further described herein.

Next, at operation 430, the set of documents is delivered to the reviewer for analysis. The review is conducted using the reviewer devices 102, 104, 106. During this review, each of the documents is categorized by the reviewer.

At the end of a reviewer session, the set of documents that was delivered to a reviewer is checked in by the reviewer at operation 440. During check-in, a determination is made regarding whether or not the reviewer has selected a class label for each document from each of the class distinctions (e.g. responsive vs. non-responsive) specified for that document. Any documents that have not been properly categorized will be returned, and the reviewer will be required to complete review and provide a proper categorization before the documents can be checked in.

Next, at operation 445, artificial intelligence techniques are used to train a predictive model based on the labels provided for each document. A wide range of artificial intelligence techniques can be used, particularly ones based on supervised learning (learning from labeled units of data). In one example, the model is a logistic regression model whose output is an estimate of the probability a document belongs to each of the possible classes in a class distinction (e.g., whether or not a document is responsive), and which is trained by finding the model coefficients that approximately maximize the likelihood of observing the class labels given the input features of the labeled training documents. In another example, the model is set of decision rules trained by the C4.5 algorithm. In another example, the model is simply a set of stored labeled units of data which is used as a nearest neighbor classifier.

In another example, the predictive model is a linear model whose coefficients are set to values specified by a variant of the BM25 term weighting method. Versions of BM25 are defined in the FREETEXTTABLE ranking within a Microsoft SQL Server. In still other examples, an artificial intelligence algorithm takes into account both labeled units of data and encoded knowledge in producing a predictive model. In one of these examples, a logistic regression model is instead trained by approximately maximizing an a posteriori likelihood that takes into account both the likelihood of the class labels, and a prior probability distribution on coefficients. This prior probability distribution can be chosen based on human knowledge of the classification task or by drawing on written reference materials. In another example, knowledge can be encoded in the form of logical rules and combined with labeled units of data to learn a predictive model using inductive logic programming. In another example, the output of multiple artificial intelligence models is combined. Many other examples of artificial intelligence algorithms that use both labeled units of data and encoded knowledge to produce predictive models are known. Other types of predictive models and methods for training them can also be used.

Next, at operation 450, a determination is made regarding whether each document was categorized as responsive or non-responsive.

If responsive, control is passed to operation 460, and the document is reviewed under a quality control scheme. In this example, when documents are checked in, they are analyzed against user-created criteria. Rules can be formed to assure that the labeling, redactions, comments or other work product has been performed in a specified fashion. Rules can be combined with Boolean logic. Additional quality control can be performed once a classifier (trained model) has been created. Reports and searches can be run to find disagreements between human reviewers and the classifier on certain categorizations.

If, instead, the document was categorized as non-responsive at operation 460, the document is moved to a non-responsive repository.

Finally, at operation 480, a determination is made regarding whether or not review of the corpus of documents is complete. Various methods can be used to make this determination. One example of such a determination is described in reference to FIG. 6 below.

Figure 5:
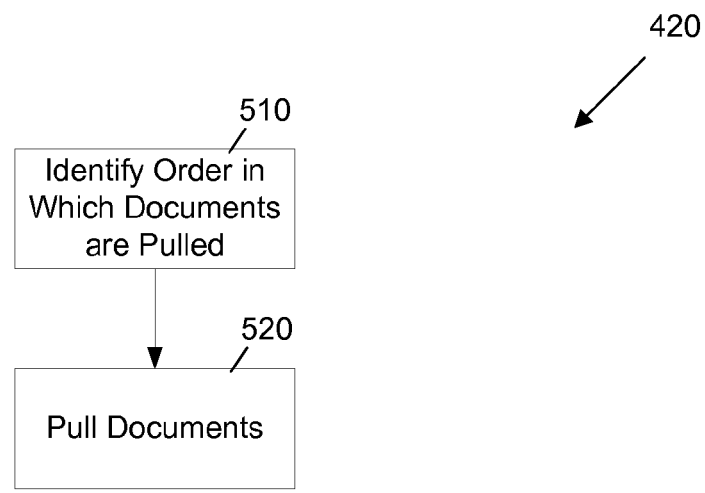
FIG. 5 shows an example method for pulling documents for review as part of the method of FIG. 4.

Referring now to FIG. 5, additional details regarding operation 420 is shown. As described above, at operation 420, a set of documents is pulled for review.

In example embodiments, the documents can be pulled using various schemes. At operation 510, one or more of the schemes is selected.

In one example, the documents are pulled using a FIFO approach. In other words, documents are pulled based on the order in which the documents have been entered into the system. For example, if 1,000 documents are populated as a corpus, the first 100 of the documents entered into the system can be pulled and delivered as a first set for review by a reviewer.

In another example, the documents are pulled based on the custodian(s) associated with the documents. For example, each document in the population can be identified based on who controlled the document when the document was collected. Upon review, the documents can be pulled based on the custodian associated with the documents. For example, the population of documents can include a set of documents that were controlled by a CEO of a company. Those documents listing the CEO as the custodian can be pulled from the population for review.

In yet another example, the documents can be pulled based on a ranking or scoring scheme for the documents. For example, as described further below, the documents can be analyzed (e.g., using an artificial intelligence model), and the documents can be pulled for the reviewer based on the ranking or score assigned each document by the artificial intelligence model.

In another example, the documents can be selected by random sampling from the population of documents, as described in more detail below.

Finally, a hybrid of more than one scheme can be used to determine which documents are pulled. For example, in another embodiment, some documents can be pulled based on a ranking. Other documents, such as randomly selected documents, can be interspersed into the set of documents pulled based on ranking. This hybrid set of documents, described further below, can be delivered to the reviewer for review. In another embodiment, documents can be pulled based on a list of priority custodians and further ordered by relevance ranking. This hybrid method can in fact use any database query to first filter the documents in the corpus and then order by relevance.

After the set of documents is determined, control is passed to operation 520, and the documents are pulled from the database(s).

Figure 6:
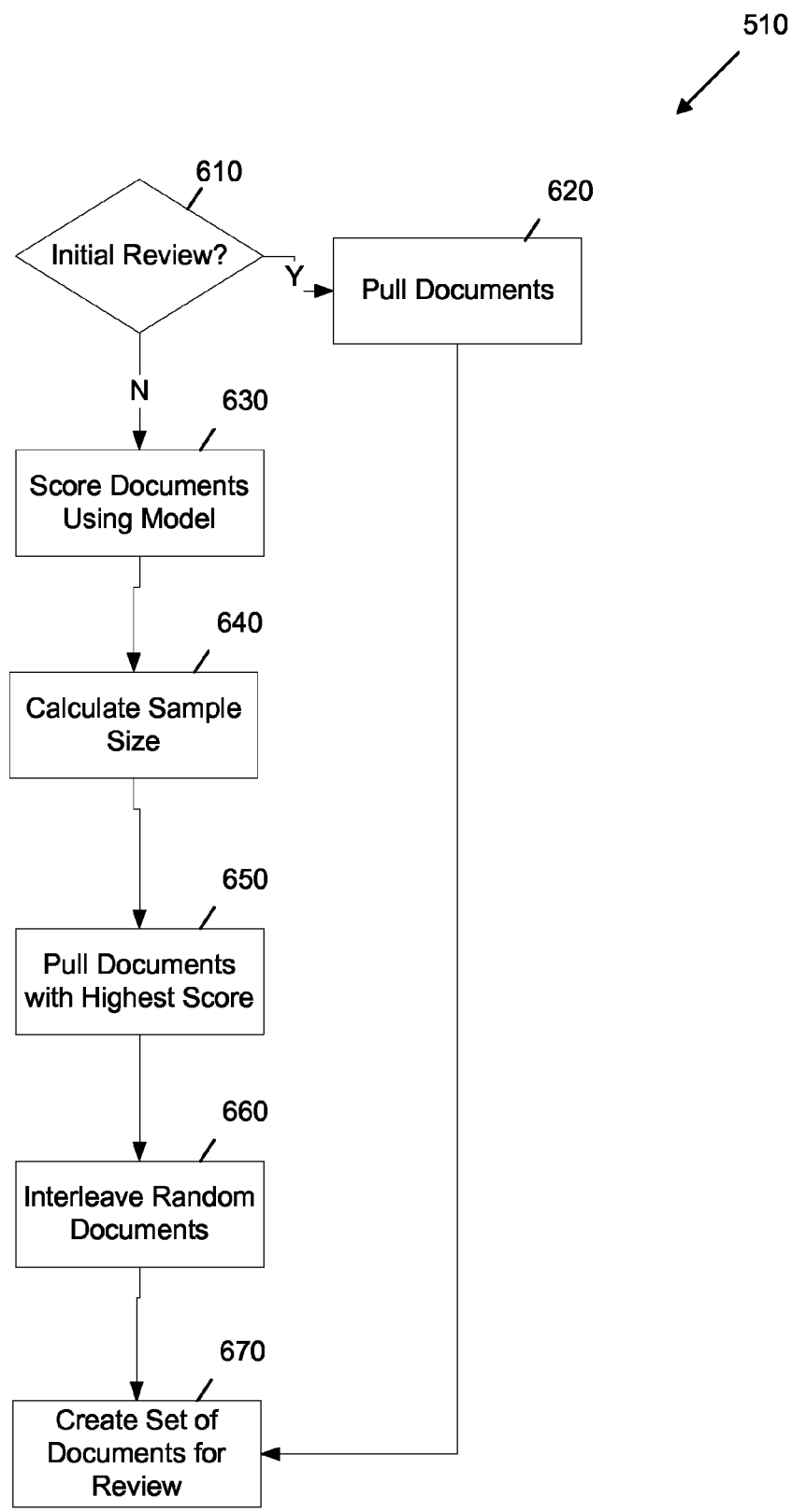
FIG. 6 shows additional example details of the method for pulling documents of FIG. 5.

Referring now to FIG. 6, additional details on the operation 510 for pulling documents for review is shown.

Initially, at operation 610, a determination is made regarding whether or not the artificial intelligence model has sufficient accuracy to be used in selecting documents. This determination can be based on how much prior knowledge (if any) was available during training of the model, how many and what types of training documents were used in training the model, or by explicitly estimating the effectiveness of the model using a sample of labeled documents. One rule for making this determination is to start using the model when three or more documents from each class in the class distinction were used in training.

If the review is of the initial set(s) of documents, control is passed to operation 620. In this example, the documents are pulled from the population by a random sample of documents from the population.

In another embodiment, the documents are pulled based on a FIFO scheme. For example, with a corpus of 100,000, the set of 100 documents that was first entered into the database is pulled for review. This set of documents is then prepared for review at operation 670. In alternative embodiments, other schemes can be used to pull this initial set of documents. For example, in another embodiment, the documents can be selected by one or more queries run against a text retrieval system. In another example, the documents can be selected by random sampling. In another example, the documents may be chosen based on user knowledge of important documents.

In alternative embodiments, operations 610, 620 can be eliminated. Instead, the operation 510 can be initiated by simply pulling a set of sample documents from the entire document population.

Alternatively, if initial review is completed, control is passed to operation 630, and the remaining documents to be reviewed in the population are scored using a model that has been trained based on the review of the initial sets of documents, as described above.

Next, at operation 640, the size of the random sample to be drawn from a batch of documents to be reviewed is calculated. In some examples, the sample size is selected based on various parameters.

Figure 7:
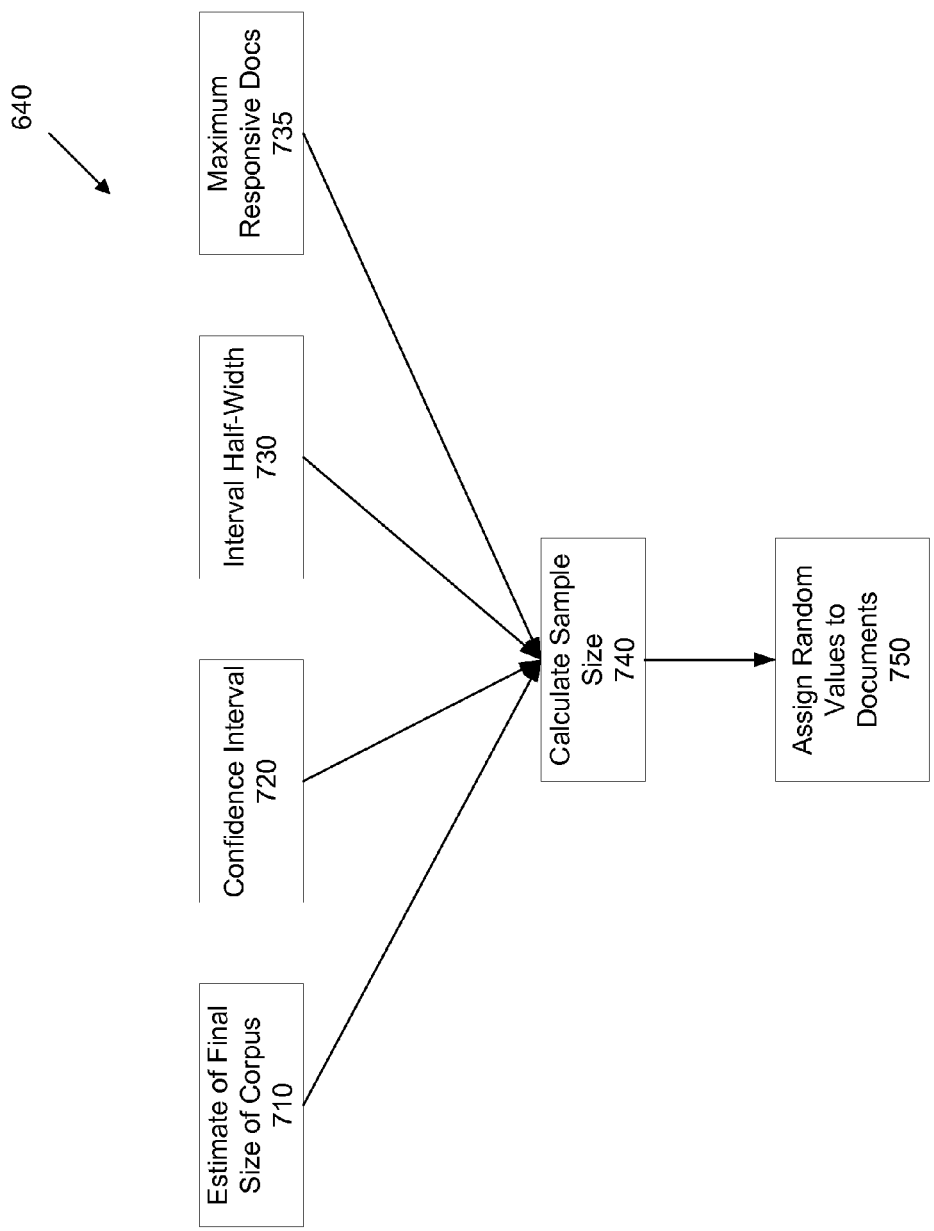
FIG. 7 shows example parameters for calculating an example sample size.

For example, referring to FIG. 7, in one example, the random sample will be used to estimate the number of unreviewed responsive documents, and the random sample size is set based on four parameters: (i) an estimate of the minimum final size of the corpus 710; (ii) a confidence level 720; (iii) a confidence interval half-width 730; and (iv) the maximum plausible proportion of responsive documents in the final corpus 735.

If all documents are delivered at the same time, then the estimated minimum final size of the corpus can simply be the actual known size of the corpus. More commonly, not all documents are delivered at the same time. For example, during litigation, not all documents are typically provided for review at one time. The availability of documents for review can be impacted by many factors, such as the collection rate of the documents, manipulation of the documents for review (e.g., if the documents are in hard copy or an inaccessible electronic format that needs to be converted for electronic review), changes in scope and size of the expanding corpus of documents (e.g., if new document requests are received expanding the scope of discovery), and/or document availability. In such situations, whatever knowledge is available can be used to specify a lower bound estimate, i.e., a number of documents such that the final corpus will almost certainly have that many documents. The estimate for the size of the corpus is taken into account in calculating the sample size, as described further below. Estimates that are too high or too low can be adjusted, as described below.

The confidence level 720 specifies how confident the user wants to be that the confidence interval produced for the number of unreviewed responsive documents (see below) contains the true value of the number of unreviewed responsive documents. For example, a confidence level of 0.95 (95%) means that the user wants a probability no higher than 1.0−0.95=0.05 (5%) that an unlucky choice of the random sample will lead to a confidence interval that does not contain the true value of the number of unreviewed responsive documents. The symbol a is often used for 1 minus the confidence level, and a user can specify either the confidence level or, equivalently, a value for a. Achieving a higher confidence level typically requires a review of a larger random sample than would achieve a lower confidence level. The specified confidence level is taken into account in calculating the sample size, as described further below.

The confidence interval half-width 730 specifies how much uncertainty about the number of unreviewed responsive documents the user is willing to tolerate in the confidence interval. For example, the user may specify the confidence interval half-width in the form of a percentage, 1%, 2%, 3%, or 5%, which is interpreted as a percentage of whatever the final size of the corpus turns out to be. The specified confidence interval half-width is taken into account in calculating the sample size, as described further below.

The maximum plausible proportion 735 specifies the maximum fraction of responsive documents that could exist in the final corpus. If this value is not known, or could be greater than 0.5, it can be set to the value 0.5, which will give a sufficient sample size for any fraction of responsive documents.

In one example, these parameters 710, 720, 730, and 735 are used to calculate a sample size 740 as following. Let $m_e^{hmin}$ be the lower bound estimate on the final corpus size, $\alpha$ be 1.0 minus the confidence level, d be the confidence interval half-width, and $f_e^{hmax}$ the maximum plausible proportion. Then the following formula will give a sample size that meets the user goals:

$$n_e^{desired} = \frac{m_e^{hmin} z_{\alpha/2}^2 f_e^{hmax}(1-f_e^{hmax})}{d^2(m_e^{hmin}-1) + z_{\alpha/2}^2 f_e^{hmax}(1-f_e^{hmax})}$$

where $z_{\alpha/2}=\Phi^{-1}(1-(\alpha/2))$, and $\Phi^{-1}(x)$ is the inverse cumulative normal distribution function.

With these definitions, there are two typical scenarios. In Scenario 1, a random sample of exactly the size appropriate for the final collection is drawn. This is true if the entire collection is received at once. It is also true if the collection is received in batches, but the final size of the collection is known in advance, or if the system is allowed to go back and sample additional items from earlier batches after seeing later ones. It is also true if the system is allowed to defer the decision of whether an item will be included in the sample until the final collection size is known.

In Scenario 2, the corpus is received in batches (including the extreme case where one document is received at a time), and it is necessary to decide as each document is received whether it will be included in the sample. When drawing a simple random sample in Scenario 2, there is an additional possible source of error: that, by the end of sampling, the sample selected may turn out to be smaller than intended. However, one may still achieve a desired confidence level by sampling in a fashion that on average chooses a larger sample than necessary, but has a very low probability of drawing too small a sample.

For example, in Scenario 1, suppose $m_e^{hmin}=200{,}000$ is the lower bound estimate on the final corpus size, one wants a confidence level of 95% ($\alpha=0.05$) and a confidence interval half width of 1% of the corpus size (d=0.01), and the conservative value $f_e^{hmax}=0.5$ is used. Then the desired sample size is:

$$\begin{aligned}n_e^{desired} &= n_e^{fpc} \\ &= \frac{m_e^{hmin} z_{\alpha/2}^2 f_e^{hmax}(1-f_e^{hmax})}{d^2(m_e^{hmin}-1)+z_{\alpha/2}^2 f_e^{hmax}(1-f_e^{hmax})} \\ &= \frac{m_e^{hmin} z_{0.025}^2 f_e^{hmax}(1-f_e^{hmax})}{d^2(m_e^{hmin}-1)+z_{0.025}^2 f_e^{hmax}(1-f_e^{hmax})} \\ &= \frac{200000(1.95996)^2(0.5)(1-0.5)}{(0.01)^2(200000-1)+(1.95996)^2(0.5)(1-0.5)} \\ &= \frac{200000(0.96036)}{19.9999+0.96036} \\ &= 9163.6 \approx 9164\end{aligned}$$

In Scenario 2, one needs to account for both types of error. One way to achieve an overall confidence level of $\alpha$ is to sample in a fashion that will, with probability $\alpha/2$ choose a sample of at least the size that gives a maximum probability of $\alpha/2$ that the confidence interval produced for the statistic of interest (e.g. the number of unreviewed responsive documents) does not contain the true value of the statistic of interest. Then the probability that either the sample is too small, or that the sample is big enough but the confidence interval it produces is problematic, is at most $\alpha$. Returning to the example, if one again wants a confidence level of 95% ($\alpha$=0.05) and a confidence interval half width of 1% of the corpus size (d=0.01), and uses the conservative value $f_e^{hmax}$=0.5, one needs to attempt to draw a sample of size that would give a confidence level of 1–$\alpha$/2=0.975 (97.5%). That sample size is:

$$n_e^{desired} = n_e^{fpc}$$

$$= \frac{m_e^{hmin} z_{\alpha/4}^2 f_e^{hmax}(1 - f_e^{hmax})}{d^2(m_e^{hmin} - 1) + z_{\alpha/4}^2 f_e^{hmax}(1 - f_e^{hmax})}$$

$$= \frac{m_e^{hmin} z_{0.0125}^2 f_e^{hmax}(1 - f_e^{hmax})}{d^2(m_e^{hmin} - 1) + z_{0.0125}^2 f_e^{hmax}(1 - f_e^{hmax})}$$

$$= \frac{200000(2.241403)^2(0.5)(1 - 0.5)}{(0.01)^2(200000 - 1) + (2.241403)^2(0.5)(1 - 0.5)}$$

$$= \frac{200000(1.25597)}{19.9999 + 1.25597}$$

$$= 11817.6 \approx 11818$$

In the above example the probabilities of the two types of errors equal are made equal, but that is not necessary. One can, for instance, choose the sample in a fashion such that the probability of too small a sample is much less than $\alpha$, while the probability of too narrow a confidence interval is just slightly less than $\alpha$.

Once the desired sample size is defined, each document is randomly assigned a number between 0 and 1 at operation 750 as it is received. In one embodiment this is done by computing an MD5 hash code for the document and interpreting its bit pattern as a number between 0 and 1.

Referring again to FIG. 6, at operation 650, a set of scored documents is pulled from the all documents received so far for review. In this example, the 90 highest ranked documents can be pulled for review.

Next, at operation 660, a set of random documents is interspersed within the 90 ranked documents. In this example, the documents are pulled based on the random number that was assigned to each document as it was received.

For example, suppose the desired random sample size is 1,000 for an estimated minimum final corpus size of 10,000 documents. In Scenario 1 described above, one can simply choose 1000 documents with the lowest values of the random number. In Scenario 2 described above, the random number for each document can be compared with a threshold value when the document is received, and those documents with a random number less than the threshold can be included in the random sample. A threshold value of 0.1 would on average give a sample size of 1000, but there would also be a substantial possibility of fewer than 1000 documents being selected as well. One can therefore choose a threshold value smaller than 0.1, so that the probability of too small a sample is $\alpha$/2, as in the example above, or is some other small value. This threshold value can be determined based on the distribution of a binomial random variable.

In another example, the documents are selected by the number assigned to them based on a "most likely to be included in a sample" basis. For example, if an initial corpus of documents allows for a threshold value of 0.1, all documents with assigned numbers of less than 0.1 qualify to be included in the sample, such as a Document A assigned a number of 0.06 and a Document B assigned a number of 0.03. However, if another delivery of documents grows the total corpus beyond the minimum bound, the threshold could be lowered to adjust the sample size. For example, if the threshold is lowered to 0.05, Document A would fall outside the sample, while Document B would still be included in the sample. In such an example, Document B could be selected ahead of Document A for inclusion in the original sample, since it is more likely that Document B would still qualify for the sample set of a larger corpus.

This process of interspersing randomly sampled documents among the other documents for review minimizes reviewer bias in reviewing those documents, as well as giving the reviewer a diverse perspective on the collection. The randomly sampled documents can be used in estimating effectiveness of review, and for determining when the review can be terminated, as described below.

For example, ten random documents from the remaining population of documents to be reviewed can be randomly mixed with a set of 90 documents chosen due to having high scores or ranks. This complete set of 100 documents is then packaged as a set of documents for review at operation 670.

In example embodiments using the methodology illustrated in FIGS. 5 and 6, the review of the documents can be completed without having a reviewer analyze each document in the corpus. Instead, at any point in review an estimate can be computed of how many responsive documents have not yet been reviewed, and review may be terminated when this estimate shows with high confidence that a sufficiently small number of unreviewed responsive documents remain.

For instance, one possible rule for stopping review is to stop when a 95% confidence interval for the number of unreviewed responsive documents includes the value 0. Suppose that the size of the random sample ends up being 10,000 documents, and the final size of the corpus is 1,000,000 documents. Suppose that 500 of the documents from the sample are found to be responsive. Then a 95% confidence interval for the total number of responsive documents in the corpus is 50000+/–4250.3 using a normal approximation to the hypergeometric distribution. Now suppose that a total of 150,000 documents have been reviewed (10,000 random and 140,000 high scoring), and that 47,000 responsive documents have been found. Then a 95% confidence interval for the number of unreviewed responsive documents is 3000+/–4250.3 or [–1250.3, +7250.3]. Since a negative number of unreviewed responsive documents is logically impossible, the 95% confidence interval can be written as [0, +7250.3]. So review could be stopped. Many other stopping rules are possible, including ones that use different effectiveness measures than the number of unreviewed responsive documents, and ones that use a test set which is held out from training.

As noted above, in this example, documents in a set are initially pulled in FIFO order. The documents are reviewed and included in the first training session. The training session takes into account the text, metadata, and other attributes of each document, along with its responsive/non-responsive categorization. A model is trained and all un-reviewed documents are scored. The score represents the probability, based on the current model, that the document belongs to the responsive set.

Pulling of documents in FIFO order continues until the model is considered sufficiently trained as described above. Once the model is sufficiently trained, subsequent pulls from that review group will select those documents to which the model gives the highest scores of responsiveness. Additionally, the system will intersperse documents that belong to the random sample into the document pull. As the review progresses, the model is retrained using the growing set of labeled documents. This continues, making the model more and more effective as more and more responsive documents are found and labeled.

The review group has a property that defines the size of each pull. In one example, each pull can be set at a reasonable amount of documents that can be reviewed in a given amount of time, such as an 8 hour work day. In one example, the set is provided with 100 documents. The first pull will deliver the top (100−X) highest scored documents and X documents from the random sample. The number X of randomly sampled documents to intersperse with high scoring documents can be chosen based on how many randomly sampled documents remain to be reviewed, whether the characteristics of documents are substantially changing from batch to batch (randomly sampled documents are ideally interspersed with high scoring documents that have similar characteristics), and user experience with what proportion of random and high-scoring documents lead to the fastest classifier improvement.

In this example, the interface displaying documents to the reviewer randomly intersperses random documents and high-scoring documents, and does not display the scores of documents. The intention is that the reviewer's judgment of responsiveness is not biased by knowledge of the current model's prediction of the responsiveness score.

Because of the rolling nature of a typical document production, the total number of documents in the corpus will typically grow over time (i.e., the "expanding" or "rolling" corpus). If at some point size of the document corpus exceeds the estimated minimum final size, this means that the proportion of the corpus that needs to be included in the random sample will be lower, and thus the threshold on random numbers used to select documents for inclusion in the random sample can be reduced to save reviewer effort. Documents which were previously included in the random sample, but have a random number above the new threshold can then be omitted from the random sample when re-computing confidence intervals in order to maintain unbiased estimates. In an alternative embodiment, a stratified sampling estimator can be used which takes into account all the randomly sampled documents, despite their being chosen based on different thresholds.

Conversely, it is possible that the final corpus size is smaller than the estimated minimum final size. In that case one may, for example, go back and randomly sample additional items from the whole corpus (using a new higher threshold) or, if that is not possible, accept a final confidence interval which may have a larger half-width than originally desired.

In alternative embodiments, more than a single binary classification (e.g., responsive vs. non-responsive) can be used. In such an embodiment, multiple class distinctions, each associated with two or more possible class labels, can be defined for documents. Examples of such distinctions include privileged vs. non-privileged, relevance to points of law, presence or absence of important entities related to the case (people, products, etc.), type of document (e.g., marketing document, sales document, technical document, etc.) and/or importance of document (e.g., low, medium, high). Labels for each of the distinctions being used can be assigned to each document at the time it is reviewed. Some of the class distinctions may be such that a document can have partial membership in one or more classes from the distinction, in which case a reviewer could indicate membership of the document in one or more classes from the distinction.

For example, in one embodiment, a document is first classified as responsive or non-responsive. For responsive documents, a list of additional class distinctions is provided by the system, and the reviewer can select one or more of the distinctions to be used in labeling the document.

In other embodiments, models can be trained for these additional class distinctions, so that the models can provide predictions of which class label should be associated with each document for each class distinction. Reviewers can be presented with these suggested class labels and can confirm or revise the labels upon review of the document.

In other embodiments, the class labels assigned by a reviewer can be validated against the class labels assigned by the models. Discrepancies can be explored to provide further training to the models.

In other embodiments, determinations can be made regarding the effectiveness of each classifier. In one embodiment, a random sample set is used, similar to the random sample sets described herein, to estimate the number of responsive documents. This set is used to compare human categorization decisions with automated (i.e., computer) categorization decisions.

In other embodiments, comparison of the human and automated categorizations can be performed using different metrics than number of unreviewed responsive documents. These metrics can include accuracy, recall, precision, and the F-measure (a weighted combination of precision and recall). If the results are unsatisfactory (e.g., the automated classification falls below a certain threshold desired for accuracy as compared to human categorization), then further training can be done.

In some examples, the user can modify the strategy for the training process as desired to impact the review of the documents. For example, in some embodiments, the user can manipulate the blend of documents provided to reviewers. This impacts how the system learns and operates.

In this example, the user can select recommended settings (i.e., default settings) or can use custom setting to manipulate the training process. These changes modify the training set (i.e., the set of documents submitted to train the system to categorize documents) and the testing set (i.e., the set of documents that determines the accuracy of the system within a given margin of error).

For the recommended setting, the blend of training and testing documents is modified over time. During early review, the training set is larger to allow the system to learn how to categorize documents. During mid-review, the number of training and testing documents equalize. Finally, late in review, the number of testing documents increases to verify that the system has learned to categorize documents correctly. By using the custom settings, the user can modify this blend of documents.

For example, the user may choose to maximize training when doing an internal investigation of documents that will not be produced in litigation. In this instance, the user wants the system to ramp-up learning quickly, and confidence in the system's suggestions is less important. In such a scenario, the user will obtain high effectiveness measure scores, but may not know how accurate the scores are.

In an opposite scenario, the user may choose to maximize testing when the user is satisfied that training is complete and the user wants to quickly reach the desired margin of error. In this scenario, the user can reach the margin of error more quickly; however, additional training might be required to obtain the desired level of accuracy.

Figure 8:
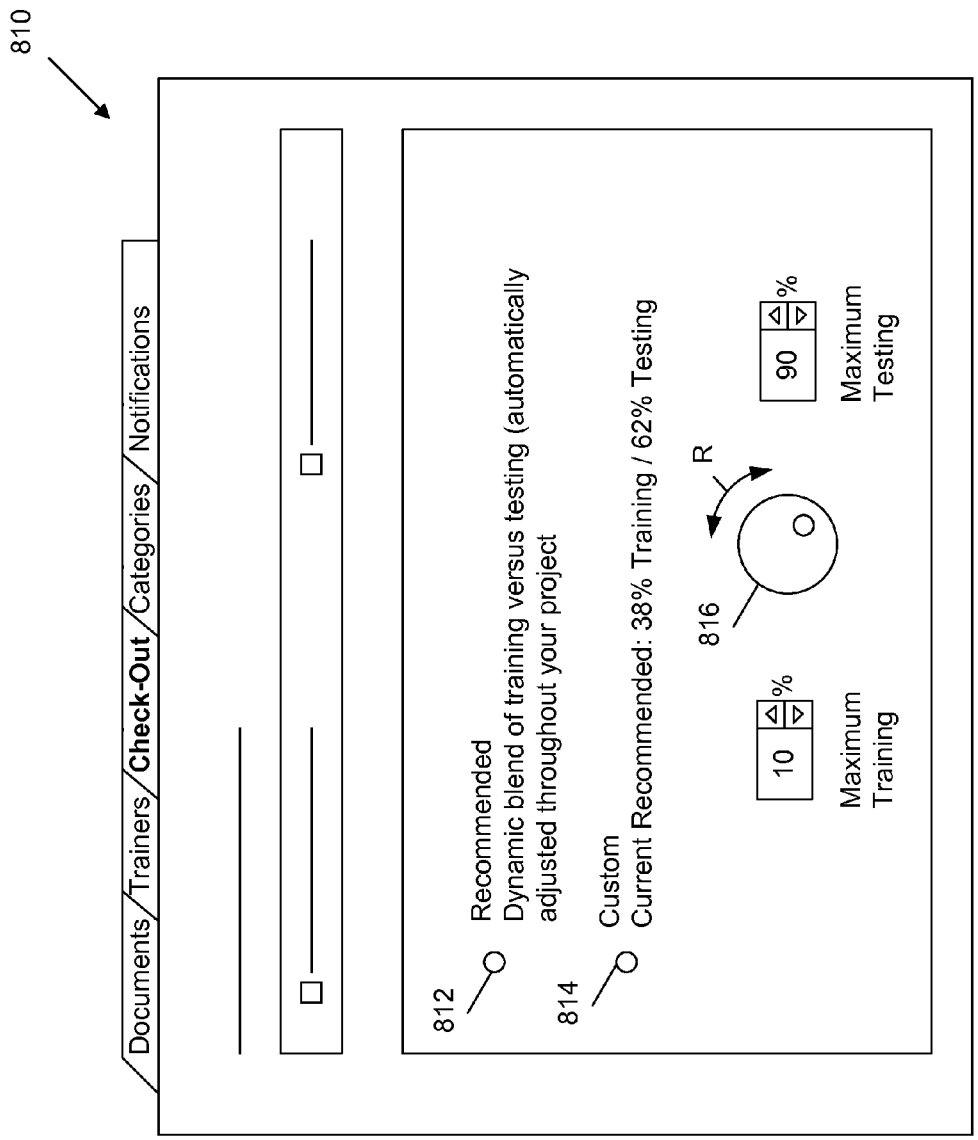
FIG. 8 shows an example user interface for customizing review of documents.

Referring now to FIG. 8, an example user interface 810 is shown for customizing the review provided by the system. In this example, the user can select between a radio button 812 for recommended settings and a radio button 814 for custom settings.

If the radio button 814 is selected, the user can modify the percentage of training and testing documents used by the system. In this example, the user interface 810 includes a dial 816 that is rotated by the user in directions R to change the percentage of "maximum training" and "maximum testing." Alternatively, arrows can be used to modify the values, or the values can simply be selected and overwritten. In this example, the user has selected ten percent training and ninety percent testing. This deviates from the recommended values, which are displayed adjacent to the radio button 814 (i.e., thirty-eight percent training and sixty-two percent testing). The user can manipulate the user interface 810 to obtain the desired blend of training and testing.

In other examples, other processes can be used to enhance the automated review of the documents in the corpus. Examples of some of these processes are described below.

In one example, groups of closely related documents are formed and one new document feature is formed for each group of documents. The new feature takes on a non-zero value for any document that to some degree belongs to the corresponding group of documents. Including such features in the document representation reduces the influence on training of documents that happen to have many closely related documents. In one embodiment, the groups of closely related documents are formed using techniques for detecting duplicate or near-duplicate documents in a batch or incremental fashion. In another embodiment, groups of closely related documents are formed using statistical document clustering methods which group documents which have related content, but which are not necessarily duplicates or near duplicates, in a batch or incremental fashion. Groups of documents can be such that each document belongs to exactly one group, belongs to multiple groups, or belongs to different groups with different degrees of membership. Groups can correspond to abstract mathematical structures, such as the factors produced by techniques such as Latent Semantic Indexing (LSI).

In another example, instead of creating new features to correspond to groups of documents, the system simply enforces that only one document from each group is allowed to be used for training. In another example, all operations including sampling are done on such a de-duplicated collection. In another example, each group of documents is represented by a single feature vector produced by taking the centroid of the feature vectors of the group members.

In another example, groups of related documents are used to save reviewer effort. When a reviewer assigns a label to one document from the group, the label is optionally propagated to all other documents in the group.

In another example, various features of the documents can be normalized during the processing of the documents to provide more information or better discrimination among classes. For example, dates associated with documents can be captured and put into a canonical format. This aids both the use of dates as features in a predictive model, and improves reporting, such as grouping of documents by different timeframes. A single date can contribute to multiple sets of features, e.g. a set of features corresponding to years, another set corresponding to months, another set corresponding to days of the week, etc. Other types of linguistic entities, such as names, can also be put into a canonical format to provide both better predictive features and better reporting.

A document often includes multiple fields, which may be encoded, for instance, as different attributes in a relational database, as different elements in an XML representation, or by other methods. In one embodiment, all fields are mapped to the same set of features. In another embodiment, each field is mapped to its own set of features. In another embodiment, a subset of fields may be combined in generating one of the sets of features. For instance all fields that may be interpreted as textual in some fashion (including both textual fields such as a title or body of document, and metadata fields such as names, dates, etc.) could be mapped to a single set of features (as well as, possibly, each having its own set of corresponding features). This allows for features to be highlighted in an interface based on the context in which evidence for the features are present in the document.

For example, the term "Re:" has a different meaning if included in a header of an email as opposed to a body of an email. By defining a separate feature set for each text field, these differences can be addressed. On the other hand, defining a common set of features based on all text fields allows accumulating evidence about terms that have the same meaning in all fields. Machine learning algorithms can then be used to discover which individual features are most predictive.

In addition, in other examples, binary features can be defined to capture certain distinguishing aspects of documents. For example, if a certain block of a boilerplate text (e.g., a signature and/or legal disclaimer on emails from an individual) occurs in many documents, a binary feature can be defined to indicate whether or not a particular document contains that boilerplate. This can help machine learning avoid overweighting the individual words that occur in the boilerplate text. Other binary features, such as an indicator of whether a particular field is empty or populated (e.g., the cc: field of an email) can be defined.

In other examples, hierarchical information associated with a document can be mapped to multiple features which encode membership of the document at different levels of the hierarchy. Examples of hierarchical information include file system path names (e.g. /users/jones/projects/purpleball/mkting/jul09.doc), email addresses (Joe @ example.com), URLs (e.g. http://www.example.com/bmwuk/auc/homepage), physical locations (e.g. World:North America:US:Wisconsin:Madison:500 Circle Rd:Room 201), organizational hierarchies (e.g. BigCo, Auto Division, Marketing, Group 7), and labels from hierarchical ontologies and categorization schemes (e.g. Products-Vehicles-Autos-Sedans).

One way to map a single hierarchical expression to multiple features capturing position in the hierarchy is to produce one truncation of the expression for each natural division in the expression. For instance, if World:North America:US:Wisconsin:Madison:500 Circle Rd:Room 201 is the value of field X for the document, the document could be given a value of 1.0 on each of these features XTrunc:World!North-America!US!Wisconsin!Madison!500-Circle-Rd!Room-201, XTrunc:World!North-America!US!Wisconsin!Madison!500-Circle-Rd, XTrunc:World!North-America!US!Wisconsin!Madison, XTrunc:World!North-America!US!Wisconsin, XTrunc:World!North-America!US, XTrunc:World!North-America, XTrunc:World.

Document collections often contain text in multiple human languages. Accurate methods are available for detecting in which language a portion of a text is written. In one example, portions of text from each language are mapped to their own set of features. In another example, portions of text from all languages is also mapped to a common set of features, allowing terms which are common across languages (e.g. part numbers, product names, etc.) to accumulate evidence from all languages. In another example both approaches are used. In another example, machine translation is applied to translate portions of text from one language into another, and the target translation is used in generating features.

Document collections sometimes contain text which has been produced by applying optical character recognition to scanned documents. This text may have noise at both the character and word level. A variety of approaches are known for creating more effective features and doing more effective machine learning with noisy data of this sort.

Document collections sometimes contain text which has been produced by applying speech recognition to audio data, or image processing to image files. A variety of approaches are known for creating more effective features and doing more effective machine learning with noisy data of this sort.

Document collections sometimes contain very short texts with many abbreviations, such as are typical in instant messaging, tweeting, and similar communication methods. A variety of approaches are known for creating more effective features and doing more effective machine learning with data of this sort.

In other examples, when the predictive model is not yet adequately trained, the documents for review can be chosen by methods other than FIFO. In one example, the documents can be selected by one or more queries run against a text retrieval system. In another example, the documents can be selected by random sampling. In another example, the documents may be chosen based on user knowledge of important documents.

In other examples, documents are pulled for review by other methods than being given the highest scores by a sufficiently trained classifier for the responsive vs. non-responsive distinction. In one example, documents which score highly on a model for some other distinction are used. In another example, the scores of the documents on models for several distinctions are combined in some fashion and the highest scoring documents are selected. In another example, documents with intermediate scores, documents with scores near a threshold, or documents whose scores have a particular distribution, can be selected in addition to or instead of documents with the highest scores.

In other examples, alternative methods for presenting a mixture of documents selected randomly and documents selected based on their scores can be used. For instance, documents may be presented to the reviewer one at a time based on randomly deciding whether to choose a document based on score or based on random sampling, and then selecting the document in that fashion.

These are examples of various processes that can be used to enhance the automated review of the documents in the corpus. The processes can be combined as desired, and additional techniques can be used.

The example embodiments described herein can be implemented as logical operations in a computing device in a networked computing system environment. The logical operations can be implemented as: (i) a sequence of computer implemented instructions, steps, or program modules running on a computing device; and (ii) interconnected logic or hardware modules running within a computing device.

For example, the logical operations can be implemented as algorithms in software, firmware, analog/digital circuitry, and/or any combination thereof, without deviating from the scope of the present disclosure. The software, firmware, or similar sequence of computer instructions can be encoded and stored upon a computer readable storage medium and can also be encoded within a carrier-wave signal for transmission between computing devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for reviewing a collection of documents, the method comprising:
   forming a set of scored documents by scoring all documents in the collection of documents using an artificial intelligence model, wherein every document in the collection of documents has not been scored previously;
   forming a subset of scored documents by selecting a subset of documents meeting a certain criteria from the set of scored documents;
   forming a set of randomly-selected documents by randomly-selecting one or more documents from the collection of documents;
   forming a set of documents for review, the set of documents for review including both the subset of scored documents and the set of randomly-selected documents;
   presenting the set of documents for review by a reviewer in a manner that does not differentiate between the set of randomly-selected documents and the subset of scored documents;
   outputting, by the artificial intelligence model, a class label encoding a prediction of whether a particular document in the set of documents for review is responsive or non-responsive; and
   if the particular document is responsive, outputting, by the artificial intelligence model, a prediction of a secondary class label associated with the particular document,
   wherein the secondary class label encodes a prediction of the particular document's membership in one or more classes including: areas of law or type of document, wherein the type of document includes marketing document, sales document, and technical document.

2. The method of claim 1, further comprising receiving class labels assigned by the reviewer to one or more of the documents in the set of documents for review.

3. The method of claim 2, further comprising:
   using one or more of the class labels assigned by the reviewer to further train the artificial intelligence model; and
   re-scoring all documents in the collection of documents using the artificial intelligence model.

4. The method of claim 2, further comprising verifying that the reviewer provided at least one of the class labels for each document in the set of documents for review.

5. The method of claim 2, wherein at least one of the class labels indicates if a particular document is responsive or nonresponsive.

6. The method of claim 2, further comprising:
   receiving a first class label assigned by the reviewer for a particular document in the set of documents for review indicating if the particular document is responsive or nonresponsive; and
   receiving a second class label assigned by the reviewer for the particular document indicating the particular document's membership in one or more classes including: area of law; type of document; or importance.

7. The method of claim 1, wherein the artificial intelligence model is a binary classifier outputting a class label.

8. The method of claim 1, further comprising calculating a size of a sample to be drawn from the documents using:
   (i) an estimate of a final number of documents that will be collected;

(ii) a confidence level specifying a degree of confidence that estimates produced using a random sample should have;

(iii) a confidence interval half-width specifying how wide a confidence interval produced using the random sample should be; and (iv) an estimate of a maximum plausible proportion of documents accounted for by a most frequent class in some class distinction.

9. The method of claim 8, further comprising assigning a random number to each of the documents to be reviewed, the random number being used to select which documents are included in the random sample.

10. The method of claim 1, further comprising allowing a user to select a blend of training and testing documents.

11. A method for reviewing a collection of documents for production during litigation, the method comprising:

forming a set of scored documents by scoring the collection of documents for production using an artificial intelligence model, wherein every document in the collection of documents for production has not been scored previously;

selecting a subset of highest scoring documents from the set of scored documents;

selecting one or more randomly-selected documents from the collection of documents;

forming a set of documents for review, the set of documents for review including both the subset of highest scoring documents and the randomly-selected documents;

presenting the set of documents for review by a reviewer in a manner that does not differentiate between the randomly-selected documents and the highest scoring documents;

receiving a class label assigned by the reviewer for one or more of the documents in the set of documents for review, wherein the class label indicates if one or more of the documents are responsive or nonresponsive; and allowing the reviewer to assign a second class label to the one or more documents, the second class label including one or more of: area of law; type of document; or importance, wherein the type of document includes marketing document, sales document, and technical document.

12. The method of claim 11, further comprising:

using the class label assigned by the reviewer to further train the artificial intelligence model; and re-scoring the documents using the artificial intelligence model.

13. The method of claim 11, further comprising calculating a size of a sample to be drawn from the documents for production using:

(i) an estimate of a final number of documents that will be collected for production;

(ii) a confidence level specifying a degree of confidence that estimates produced using a random sample should have;

(iii) a confidence interval half-width specifying how wide a confidence interval produced using the random sample should be; and (iv) an estimate of a maximum plausible proportion of documents accounted for by a most frequent class in some class distinction.

14. The method of claim 13, further comprising assigning a random number to each of the documents to be reviewed, the random number being used to select which documents are included in the random sample.

15. A method for reviewing a collection of documents for production during litigation, the method comprising:

forming a set of scored documents by scoring the collection of documents for production using an artificial intelligence model, wherein every document in the collection of documents for production has not been scored previously;

selecting a subset of highest scoring documents from the set of scored documents;

selecting one or more randomly-selected documents from the collection of documents for production;

forming a set of documents for review, the set of documents for review including both the subset of highest scoring documents and the randomly-selected documents;

presenting the set of documents for review by a reviewer in a manner that does not differentiate between the randomly-selected documents and the highest scoring documents included in the set of documents for review;

receiving a class label assigned by the reviewer for one or more of the documents in the set of documents for review;

allowing the reviewer to assign a second class label to the one or more documents, the second class label including one or more of: area of law; type of document; or importance, wherein the type of document includes marketing document, sales document, and technical document; and calculating a sample set of the documents for production using:

(i) an estimate of a total number of the documents for production;

(ii) a confidence level specifying a degree of confidence that estimates produced using a random sample should have;

(iii) a confidence interval half-width specifying how wide a confidence interval produced using the random sample should be; and (iv) an estimate of a maximum plausible proportion of documents accounted for by a most frequent class in some class distinction.

16. The method of claim 15, further comprising assigning a random number to each of the documents to be reviewed, the random number being used to select which documents are included in the random sample.

* * * * *